Patented May 15, 1945

2,375,905

UNITED STATES PATENT OFFICE 2,375,905

PHARMACEUTICAL PREPARATIONS POSSESSING SURFACE-ACTIVE PROPERTIES

Hermann Engelhard, Berlin, and Werner Petri, Lichterfelde-Ost, near Berlin, Germany; vested in the Alien Property Custodian No Drawing. Application January 23, 1942, Serial No. 427,984. In Germany January 31, 1939

2 Claims. (Cl. 167—58)

This invention relates to pharmaceutical preparations possessing surface-active properties and to a process of making same.

The invention is principally concerned with the production of a new pharmaceutical preparation for the treatment of cavities of the body, and has for its particular object to provide a pharmaceutical preparation possessing surface-active qualities.

In combating an infection or other disease of the mucous membranes of the nasal and pharyngeal cavities and of the upper air passages with the aid of disinfectants, curatives or other efficacious substances two ways are possible:

(1) When combating a disease internally, the curative is taken internally or injected and passes into the blood and thus to the point of attack of the excitants of disease. This method has nothing to do with the invention.

(2) Combating a disease from the outside usually involves dissolving the curative in the mouth.

The best disinfectants which in vitro show the strongest bactericidal properties like the remedies known under the trade names Trypaflavin (3,6-diamino-10-methyl-acridinium-chloride), Rivanol (and allied derivatives of acridine) or Prontosil (4-sulfonamide-2',4'-diaminoazo-benzene) and its allied compounds are not surface-active. When such preparations are dissolved in the mouth, the curative does not appreciably spread out from that point to, say, the mucous membranes of the nose or trachea, on which frequently the main places of the infection caused by the excitants of disease are to be found.

Apart from non-surface-active disinfectants, this generally applies also in corresponding manner to curatives or other efficacious substances which are not, or not sufficiently, surface-active. Conditions are not altered by introducing such substances for instance into the nose.

Spreading of the substances will in every instance occur merely by diffusion, i. e., very slowly and only over short distances.

Disinfectants and curatives are known also which show a different behavior. For example, if phenol is applied to the tip of the tongue, it will be found that clearly appreciable spreading occurs from there, which is limited of course by the fairly high solubility of the substance, since phenol, unlike the above-mentioned substances, is surface-active, i. e., it spontaneously spreads out when placed on a surface of water.

Film-forming surface-active substances have been known for quite a while in colloid chemistry. They form a species of substances which may belong to totally different classes of chemical compounds. Common to all of them is the tendency spontaneously to spread over the boundary surface between liquid and air, as over a water surface, while forming a monomolecular surface film. It is evident that a disinfectant or other curative or efficacious substance showing spontaneous surface diffusion would be particularly suitable for fighting diseases of the mucous membranes of the nasal-pharyngeal cavity or of other mucous membranes in cavities of the human or animal body as well as for disinfecting discharging wounds, etc., provided they have available a boundary surface of liquid and air.

The known disinfectants, however, which are surface-active themselves, have either a very slight disinfecting effect or are unsuitable owing to excessive irritation or for other reasons.

The question arises therefore how substances, as the curative known under the trade name "Trypaflavin" or any other curative or efficacious substances which are not surface-active per se, or not to a sufficient degree, can be brought to the point of attack of the excitants of disease, for example, approximately to the rear regions of the nasal-pharyngeal cavity, so as to be able to develop their healing power at that place.

The solution of the problem is offered by the following invention: A known curative substance which does not possess sufficient diffusion pressure itself, or none at all, is combined for instance with one of the surface-active substances that are also known. The union is preferably effected by dissolving or intimate mixing or emulsification.

When the solution (mixture or emulsion) of the two substances is brought upon a water surface it would be natural to expect its separation into its component parts during its application to the surface and the diffusion of only the surface-active carrier substance while the curative that is not surface-active itself would be left behind. Surprisingly, this is not the case, but even the non-surface-active component is diffused.

It is possible also to build up the non-surface-active component from several individually non-surface-active substances (for instance a disinfectant and a sedative for the affected mucous membrane or substances having other curative effects).

The curative can therefore be fully adapted to the desired healing purpose; at any rate, the product of the dissolving, mixing or emulsifying processes, in or with a film-forming surface-active carrier substance, will acquire surface-active properties and, if brought upon a water surface, spontaneously diffuse along the boundary surface liquid/air.

It should be remembered in this respect that the "classic" film-formers of colloid chemistry, such as oleic acid, are insoluble in water. Such substances, when placed upon a water surface, form a monomolecular surface film in a single spontaneous diffusing action. However, even if the most favorable dissolving conditions prevail, the quantities of non-surface-active curatives entrained during this single diffusing action will be too small to insure a sufficient healing effect.

In order to prepare a curative possessing surface-active properties it is therefore preferred to choose a surface-active component which still shows some solubility in water. The degree of solubility in each instance depends upon the surface and the quantity of the liquid over which the non-surface-active component is to be distributed. It may therefore vary within wide limits from one part per several hundred to one part per several ten thousands or even one part per one hundred thousand. Furthermore, it must be taken into consideration that the diffusion pressure in a homologous series increases with growing insolubility (Traube's rule). To obtain the greatest possible diffusion pressure the solubility chosen should therefore be as slight as possible. A relative solubility must be present, however, in each instance.

Because, if the surface-active component shows slight solubility in water, the surface film formed at first during spontaneous diffusion will dissolve and thus cause repeated diffusion. When the non-surface-active component is also soluble in water, a current distribution of the water soluble curative over the entire surface and thence into the interior of the liquid will be attained.

Should the non-surface-active component be only poorly soluble in the surface-active one greater efficiency may often be obtained by the addition of a third substance capable of dissolving both components. This component, too, should preferably be soluble in water, since otherwise within a short time the boundary surface liquid/air will be occupied by this substance and further diffusion at least be considerably hindered.

The effect of the process may be demonstrated by the following tests:

Three large clean porcelain basins (measuring approximately 30 x 35 x 6 cm.) are filled three-fourths with water of room temperature, whereupon successively (1) A small amount of the substance known under the trade name "Trypaflavin" (3,6-diamon-10-methylacridiniumchloride) in substance,
(2) A few drops of an aqueous Trypaflavin solution and
(3) A few drops of a solution of Trypaflavin in hexylalcohol are added to each of the basins. Whilst in case of tests 1 and 2 no essential diffusion over the points of application occurs, the Trypaflavin, which is non-surface-active itself, will in the third test be instantly diffused over the entire surface of water, and the diffusion can, moreover, be very often repeated, since the surface film formed at first by the hexylalcohol in spontaneous diffusion disappears due to the slight solubility of the hexylalcohol, whereupon the formation of a new film accompanied by further transport of the non-surface-active substance occurs.

Example 1

0.2 g. of the substance known under the trade name "Trypaflavin" (3,6-diamino-10-methylacridiniumchloride) and 7.5 cu. cm. hexyl-lactate (lactic acid-n-hexyl-ester) are triturated with 100 g. finely pulverized cane sugar and made into tablets if necessary.

Example 2

0.2 g. of the substance known under the trade name "Prontosil" (4-sulfonamide-2',4'-diaminoazobenzene) and 7.5 cu. cm. hexyl-lactate are triturated with 100 g. finely pulverized cane sugar and made into tablets if necessary.

These mixtures may serve for disinfecting the nasal-pharyngeal cavity.

Example 3

5 cu. cm. hexyl-lactate are thoroughly triturated with 100 g. of the substance known under the trade name "Prontosil" (4-sulfonamide-2',4'-diaminoazobenzene) in a finely pulverized state.

This pulverulent mixture to which pain-relieving agents may be added is adapted to serve as dusting powder for discharging wounds.

It is therefore possible to prepare in every instance, by dissolving, mixing or emulsifying a water soluble disinfectant, curative or other efficacious substance possessing insufficient diffusion pressure or none at all with a film-forming surface-active substance of slight water solubility, remedies which, besides their original curative effect, have also the novel property of spreading out over boundary surfaces liquid/air.

The non-surface-active component may be built up from several non-surface-active individual components to attain particular healing effects. Likewise, the carrier substance may be composed of several individual components, possibly for obtaining a favorable surface melting point or better conditions of solubility. Finally, if the dissolving power of the surface-active component is too unfavorable for the non-surface-active one, a third component may be added which per se, possibly owing to a too high solubility in water, does not show sufficient formation of film but which improves the conditions of solubility of non-surface-active curatives in the film-forming component.

We claim:

1. A pharmaceutical preparation of increased surface activity comprising a water soluble disinfecting curative, possessing insufficient surface-active properties, and lactic acid-n-hexyl-ester.

2. A pharmaceutical preparation comprising 4-sulfonamide-2',4'-diaminoazobenzene and lactic acid-n-hexyl-ester.

HERMANN ENGELHARD.
WERNER PETRI.